US008696962B2

(12) United States Patent
Chou

(10) Patent No.: US 8,696,962 B2
(45) Date of Patent: Apr. 15, 2014

(54) METHODS FOR REDUCING DEFECTS IN CERAMIC ARTICLES AND PRECURSORS

(75) Inventor: Kevin Ying Chou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 201 days.

(21) Appl. No.: 13/234,598

(22) Filed: Sep. 16, 2011

(65) Prior Publication Data

US 2013/0072370 A1    Mar. 21, 2013

(51) Int. Cl.
*B29C 47/00* (2006.01)
*B29C 47/12* (2006.01)
*C04B 35/03* (2006.01)
*C04B 35/04* (2006.01)

(52) U.S. Cl.
USPC ............... 264/177.11; 264/177.12; 501/108; 501/109

(58) Field of Classification Search
USPC ............... 501/108, 109, 118, 119, 121, 122; 264/631, 177.11, 177.12
See application file for complete search history.

(56) References Cited

U.S. PATENT DOCUMENTS

| | | | | |
|---|---|---|---|---|
| 4,745,092 A * | 5/1988 | Prunier, Jr. | ...................... | 501/119 |
| 6,080,345 A | 6/2000 | Chalasani et al. | ............. | 264/109 |
| 6,207,101 B1 | 3/2001 | Beall et al. | ..................... | 264/630 |
| 6,344,078 B1 * | 2/2002 | Beall et al. | ..................... | 106/285 |
| 6,368,992 B1 | 4/2002 | Beall et al. | ....................... | 501/94 |
| 6,372,033 B1 | 4/2002 | Chalasani et al. | ......... | 106/140.1 |
| 6,783,724 B2 * | 8/2004 | Noguchi et al. | .............. | 264/631 |
| 7,494,948 B2 * | 2/2009 | Stanley | ........................... | 501/27 |
| 2003/0151155 A1 | 8/2003 | Muroi et al. | .................... | 264/44 |
| 2010/0126132 A1 | 5/2010 | Merkel | ........................... | 55/523 |

FOREIGN PATENT DOCUMENTS

| | | | | |
|---|---|---|---|---|
| EP | 0978495 | 2/2000 | ............ | C04B 35/195 |
| EP | 1089953 | 8/2003 | ............ | C04B 35/622 |
| EP | 1093447 | 8/2003 | ............ | C04B 35/622 |
| EP | 1012126 | 10/2003 | ............ | C04B 35/622 |
| EP | 1506948 | 2/2005 | ............ | C04B 35/565 |
| WO | WO00/07956 | 2/2000 | ............. | C04B 33/32 |
| WO | WO2009/005679 | 1/2009 | ............ | C04B 35/195 |

OTHER PUBLICATIONS

Beneventi, Davide, et al., "Precipitation and Solubility of Calcium Soaps in Basic Aquec Media", Journal of Colloid and Interface Science, 237, 2001, pp. 142-144.
Patent Cooperation Treaty International Search Report—International Application No. PCT/US2012/055045—Filing Date Sep. 13, 2012—Priority date Sep. 16, 2011, (4 pages).
Patent Cooperation Treaty Written Opinion of the International Searching Authority—International Application No. PCT/US2012/055045—Filing Date Sep. 13, 2012—Priority date Sep. 16, 2011 (6 pages).

* cited by examiner

*Primary Examiner* — Noah Wiese
(74) *Attorney, Agent, or Firm* — Charles A. Greene; Matthew J. Mason

(57) ABSTRACT

A method of reducing the defects in ceramic articles and precursors, particularly ceramic articles and precursors made using a batch composition containing an oil phase material. The method includes increasing the concentration of a water insoluble soap in the batch composition, which can increase the cohesive strength of the oil phase, leading to a reduction in the incidence of defects in the ceramic articles and precursors.

19 Claims, 3 Drawing Sheets

METHODS FOR REDUCING DEFECTS IN CERAMIC ARTICLES AND PRECURSORS

BACKGROUND

The disclosure relates generally to methods of reducing defects in ceramic articles and precursors and more particularly to methods of reducing defects in ceramic articles and precursors that are made using a batch composition containing an oil phase material.

In the production of ceramic articles, such as honeycomb-shaped articles used as substrates and filters in mobile emissions applications, it is desirable to minimize the presence of defects in ware that rise to the level of causing failure to meet ever increasingly stringent customer specifications. Such defects can include not only those observed post-firing but also those observed in post-extrusion and post-drying stages, such as green fissure. Rejection of such ware results in reduced material utilization, which is undesirable.

Defects, such as green fissures, can result from a number of causes. In the production of certain ceramic articles, such as thin walled substrates for mobile emission control, a hydrophobic material such as a fatty acid or oil is often added to the batch as a lubricant. However, because typically applied binder materials, such as methylcellulose, are frequently generally insoluble in the oil phase, this phase often has substantially lower cohesive strength than the aqueous phase. This lack of cohesive strength in the oil phase can result in a type of green fissure often referred to as an oil fissure, characterized by locally concentrated oil streaks that migrate from the bulk of the batch to the skin area during extrusion. If defects caused by such fissures are severe enough, substantial losses in material utilization can occur as well as significant down time in production facilities in order to attempt to address the problem.

SUMMARY

One embodiment of the disclosure relates to a method of reducing the presence of defects in ceramic articles and precursors. The method includes determining the incidence of a defect in a plurality of ceramic articles or precursors. The method also includes increasing a concentration of a water insoluble soap in a precursor batch composition. In addition, the method includes determining the incidence of a defect in a plurality of ceramic articles or precursors made from the precursor batch composition.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
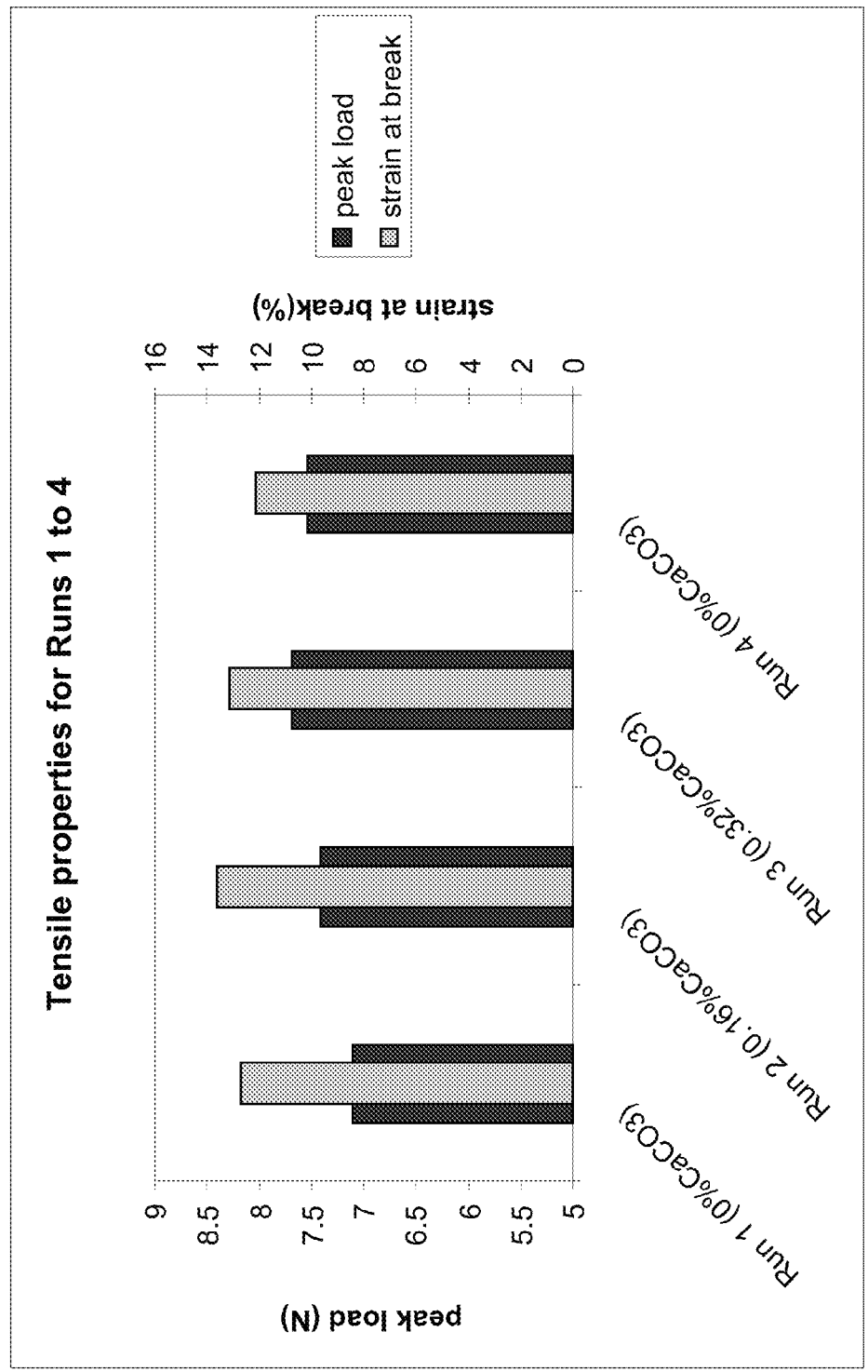
FIG. 1 charts tensile properties for four experimental runs, wherein calcium carbonate was added to a ceramic precursor batch composition in varying amounts in some experimental runs.

Various embodiments of the disclosure will be described in detail with reference to the drawings, if any.

As used herein, the term "precursors" when used in the context of "ceramic articles and precursors", refers to shaped or extruded material, such as that in the wet or green state, which can be subsequently fired to result in a ceramic article.

As used herein, "water insoluble soap" refers to a species of the general formula RCOOX, wherein R represents a generally organic constituent imparting oil phase solubility and X represents a metal, wherein the soap has a solubility limit in water at 25° C. of less than 0.001 mole per liter.

As used herein, "salt of a water insoluble soap" refers to a salt containing a metal ion of a water insoluble soap.

As used herein, "alkaline earth soap" refers to a species of the general formula RCOOX, wherein R represents a generally organic constituent imparting oil phase solubility and X represents an alkaline earth metal (beryllium, magnesium, calcium, strontium, barium, or radium).

As used herein, the term "precursor batch composition" refers to a composition of materials used to make ceramic articles and precursors.

In the production of ceramic articles, particularly those made from precursor batch compositions containing an oil phase material, certain defects such as green fissures, including oil fissures, are often caused by lack of cohesive strength in the oil phase. Applicant has surprisingly found that the oil phase cohesive strength can be increased by increasing the batch concentration of certain water insoluble soaps that are generally soluble in the oil phase. By thus increasing the cohesive strength of the oil phase, the incidence of certain defects such as green fissures, including oil fissures, may be significantly reduced.

Specifically, the incidence of one or more defects may be reduced by determining the incidence of the defect or defects in a plurality of ceramic articles or precursors, for example, by determining the percentage or fraction of ceramic articles or precursors having a certain defect or defects within a group of ceramic articles or precursors being produced. Depending on the level of defects found in the ceramic articles, the concentration of a water insoluble soap in a precursor batch composition may be increased. The incidence of the defect or defects in a plurality of ceramic articles made from the precursor batch composition in which the concentration of the water insoluble soap has been increased can then be determined. If necessary, the concentration of the water insoluble soap can be adjusted or increased at least a second time, depending, for example, on the incidence of defects (and other considerations) in ceramic articles or precursors made from the precursor batch composition in which the concentration of the water insoluble soap has been increased.

The concentration of water insoluble soap in the precursor batch composition can be increased by at least one of a number of different approaches. For example, the concentration of water insoluble soap can be increased by adding an amount of common metal ion salt of water insoluble soap to the precursor batch composition. The concentration of water insoluble soap can also be increased by adding an amount of water insoluble soap to the precursor batch composition. The concentration of water insoluble soap can additionally be increased by lowering the overall solubility product of fatty acid and water insoluble soap metal ion in the precursor batch composition.

The water insoluble soap can be selected to comprise chelateable inorganic ions that are capable of forming generally water insoluble inorganic-fatty acid complexes having at least some amount of solubility in oil. The inorganic ions can include those selected from alkaline earth elements, rare earth elements, group VIIIB elements, and group IIB elements that produce salts of organic fatty acids with solubility products (Ksp) of between $10^{-16}$ and $10^{-12}$ at 67° C.

In certain exemplary embodiments, the water insoluble soap is selected from at least one alkaline earth soap. In certain exemplary embodiments, the alkaline earth soap is at least one of a calcium soap and a magnesium soap. Exemplary calcium and magnesium soaps include calcium oleate, calcium laurate, magnesium oleate, magnesium laurate, calcium stearate, calcium palmitate, magnesium stearate, and magnesium palmitate.

In certain exemplary embodiments, the concentration of water insoluble soap in the precursor batch composition can be increased by adding an amount of a common metal ion salt of a water insoluble soap to the precursor batch composition. For example, the concentration of water insoluble soap in the precursor batch composition may be increased by adding an amount of at least one suitable alkaline earth salt to the precursor batch composition. Exemplary alkaline earth salts include calcium carbonate, calcium oxide, and calcium chloride, magnesium carbonate, magnesium oxide, and magnesium chloride.

The salt of a water insoluble soap can be added in an amount that is effective to increase the concentration of water insoluble soap according to the equilibrium relationship:

wherein [RCOOX] represents the concentration of the water insoluble soap, [RCOO$^-$] represents anionic fatty acid concentration, [X$^{+N}$] represents concentration of a metal ion of a water insoluble soap, and N represents the net positive charge of the metal ion.

In certain exemplary embodiments, the amount of common metal ion salt of a water insoluble soap, such as a suitable alkaline earth salt, added to the precursor batch composition can be at least 0.05%, such as at least 0.10%, and further such as at least 0.15%, and still further such as at least 0.20% of the weight of the dry ingredients of the precursor batch composition.

In certain exemplary embodiments, care should be taken to ensure that the amount of common metal ion salt of a water insoluble soap added to the precursor batch composition does not substantially adversely affect other properties of ceramic articles made from the composition, such as, for example, coefficient of thermal expansion (CTE). Accordingly, in certain exemplary embodiments, the common metal ion salt of a water insoluble soap, such as a suitable alkaline earth salt, is added to the precursor batch composition in an amount ranging from 0.05 to 0.40%, such as from 0.10 to 0.35%, and further such as from 0.15 to 0.30% of the weight of the dry ingredients of the precursor batch composition.

In certain exemplary embodiments, the concentration of water insoluble soap in the precursor batch composition can be increased by adding an amount of water insoluble soap to the precursor batch composition. For example, the concentration of water insoluble soap in the precursor batch composition may be increased by adding an amount of at least one suitable alkaline earth soap to the precursor batch composition. Exemplary alkaline earth soaps include calcium oleate, calcium laurate, magnesium oleate, and magnesium laurate, calcium stearate, calcium palmitate, magnesium stearate, and magnesium palmitate.

In certain exemplary embodiments, the amount of water insoluble soap, such as a suitable alkaline earth soap, added to the precursor batch composition can be at least 0.05%, such as at least 0.10%, and further such as at least 0.15%, and still further such as at least 0.20% of the weight of the dry ingredients of the precursor batch composition.

In certain exemplary embodiments, the concentration of water insoluble soap in the precursor batch composition can be increased by lowering the overall solubility product (Ksp) of fatty acid and metal ion of a water insoluble soap, wherein:

$$Ksp = [RCOO^-]^N [X^{+N}]$$

wherein [RCOO$^-$] represents anionic fatty acid concentration, [X$^{+N}$] represents concentration of a metal ion of a water insoluble soap, and N represents the net positive charge of the metal ion. This can be done by selecting a suitable combination of fatty acid and metal ion and/or by adding a suitable fatty acid to the precursor batch composition and/or wholly or partially substituting a suitable fatty acid for another fatty acid in the precursor batch composition.

For example the concentration of water insoluble soap in the precursor batch composition may be increased by lowering the overall solubility product (Ksp) of fatty acid and a suitable alkaline earth metal ion in the precursor batch composition.

In certain exemplary embodiments, the overall solubility product (Ksp) of fatty acid and alkaline earth metal ion at 67° C. in the precursor batch composition can be lowered to be below $10^{-11}$, such as below $10^{-12}$, and further such as below $10^{-13}$, and yet further such as below $10^{-14}$, such as between $10^{-11}$ and $10^{-16}$.

By adding a suitable fatty acid to the precursor batch composition and/or wholly or partially substituting a suitable fatty acid for another fatty acid in the precursor batch composition, the overall solubility product of fatty acid and metal ion, such as alkaline earth metal ion, can be lowered by at least 50%, such as by at least 90%, and further such as by at least 95%, and yet further such as by at least 99%.

In certain exemplary embodiments, the alkaline earth metal ion is calcium and the overall solubility product of fatty acid and calcium ion is lowered by adding a fatty acid having a solubility product at 67° C. with calcium ion of equal to or less than $10^{-12}$.

In certain exemplary embodiments, the alkaline earth metal ion is magnesium and the overall solubility product of fatty acid and calcium ion is lowered by adding a fatty acid having a solubility product at 67° C. with magnesium ion of equal to or less than $10^{-12}$.

In certain exemplary embodiments, the overall solubility product of fatty acid and metal ion, such as alkaline earth metal ion is lowered by adding at least one of oleic acid, stearic acid, palmitic acid, and lauric acid to the precursor batch composition and/or by substituting at least one of these acids for another fatty acid in the precursor batch composition.

The disclosure and scope of the appended claims will be further clarified by the following examples. In all of the examples below, the talc contained about 0.1 to 0.2 wt % of calcium salt as an impurity.

Example 1

Four different experimental runs were conducted from cordierite precursor batch compositions having the ingredients set forth in Table 1.

TABLE 1

| Ingredient | Run 1 (control) | Run 2 | Run 3 | Run 4 (Control) |
|---|---|---|---|---|
| Base dry ingredients (wt %) | | | | |
| Talc | 35-40 | 35-40 | 35-40 | 35-40 |
| Clay (calcined) | 20-25 | 20-25 | 20-25 | 20-25 |
| Clay (hydrous) | 15-20 | 15-20 | 15-20 | 15-20 |
| Alumina (boehmite) | 10-15 | 10-15 | 10-15 | 10-15 |
| Alumina (calcined) | 5-10 | 5-10 | 5-10 | 5-10 |
| Silica | 0-5 | 0-5 | 0-5 | 0-5 |
| Superadded ingredients (wt %) | | | | |
| Calcium carbonate | 0.00 | 0.16 | 0.32 | 0.00 |
| Hydroxypropyl methylcellulose | 2-8 | 2-8 | 2-8 | 2-8 |
| Tall oil | 0.5-2.0 | 0.5-2.0 | 0.5-2.0 | 0.5-2.0 |
| Polyalpha olefin | 5-10 | 5-10 | 5-10 | 5-10 |
| Water | 30-40 | 30-40 | 30-40 | 30-40 |
| Skin quality of extruded ware | | | | |
| | fair | better | best | fair |

The compositions were identical except for the amount of calcium carbonate, which on a weight percentage basis, was superadded in certain experimental runs in differing amounts as a dry component. Specifically, in Runs 2 and 3, calcium carbonate was added to the composition in amounts of 0.16 and 0.32 weight percent respectively. Addition of calcium carbonate to the composition results in an increased amount of calcium soap in the oil phase of the composition.

Honeycomb-shaped ware was extruded from the compositions set forth in Table 1 and evaluated for skin defects such as air checks and fissures, with skin quality results set forth in Table 1, showing that the addition of calcium carbonate improved the skin quality. FIG. 1 shows the tensile properties of the extruded materials of the experimental runs. As can be seen, the values of strain at break for Runs 2 and 3 (with calcium carbonate) were higher than those for Runs 1 and 4 (without calcium carbonate). Without wishing to be limited by theory, it is believed that the improvements in strain at break with the addition of calcium carbonate were a result of increased cohesive strength in the oil phase, consistent with the observation of reduced defects in the extruded materials.

Example 2

Four additional experimental runs were conducted from cordierite precursor batch compositions having the ingredients set forth in Table 2.

TABLE 2

| Ingredient | Run 5 (control) | Run 6 | Run 7 | Run 8 (Control) |
|---|---|---|---|---|
| Base dry ingredients (wt %) | | | | |
| Talc | 35-40 | 35-40 | 35-40 | 35-40 |
| Clay (calcined) | 20-25 | 20-25 | 20-25 | 20-25 |
| Clay (hydrous) | 15-20 | 15-20 | 15-20 | 15-20 |
| Alumina (boehmite) | 10-15 | 10-15 | 10-15 | 10-15 |
| Alumina (calcined) | 5-10 | 5-10 | 5-10 | 5-10 |
| Silica | 0-5 | 0-5 | 0-5 | 0-5 |
| Superadded ingredients (wt %) | | | | |
| Calcium chloride | 0.00 | 0.08 | 0.16 | 0.00 |
| Hydroxypropyl methylcellulose | 2-8 | 2-8 | 2-8 | 2-8 |
| Tall oil | 0.5-2.0 | 0.5-2.0 | 0.5-2.0 | 0.5-2.0 |
| Polyalpha olefin | 5-10 | 5-10 | 5-10 | 5-10 |
| Water | 30-40 | 30-40 | 30-40 | 30-40 |
| Skin quality of extruded ware | | | | |
| | fair | better | best | fair |

The compositions were identical to each other and to those set forth in Example 1 except calcium chloride (instead of calcium carbonate), was superadded in certain experimental runs in differing amounts as a dry component. Specifically, in Runs 6 and 7, calcium chloride was added to the composition in amounts of 0.08 and 0.16 weight percent respectively. Addition of calcium chloride to the composition results in an increased amount of calcium soap in the oil phase of the composition.

Figure 2:
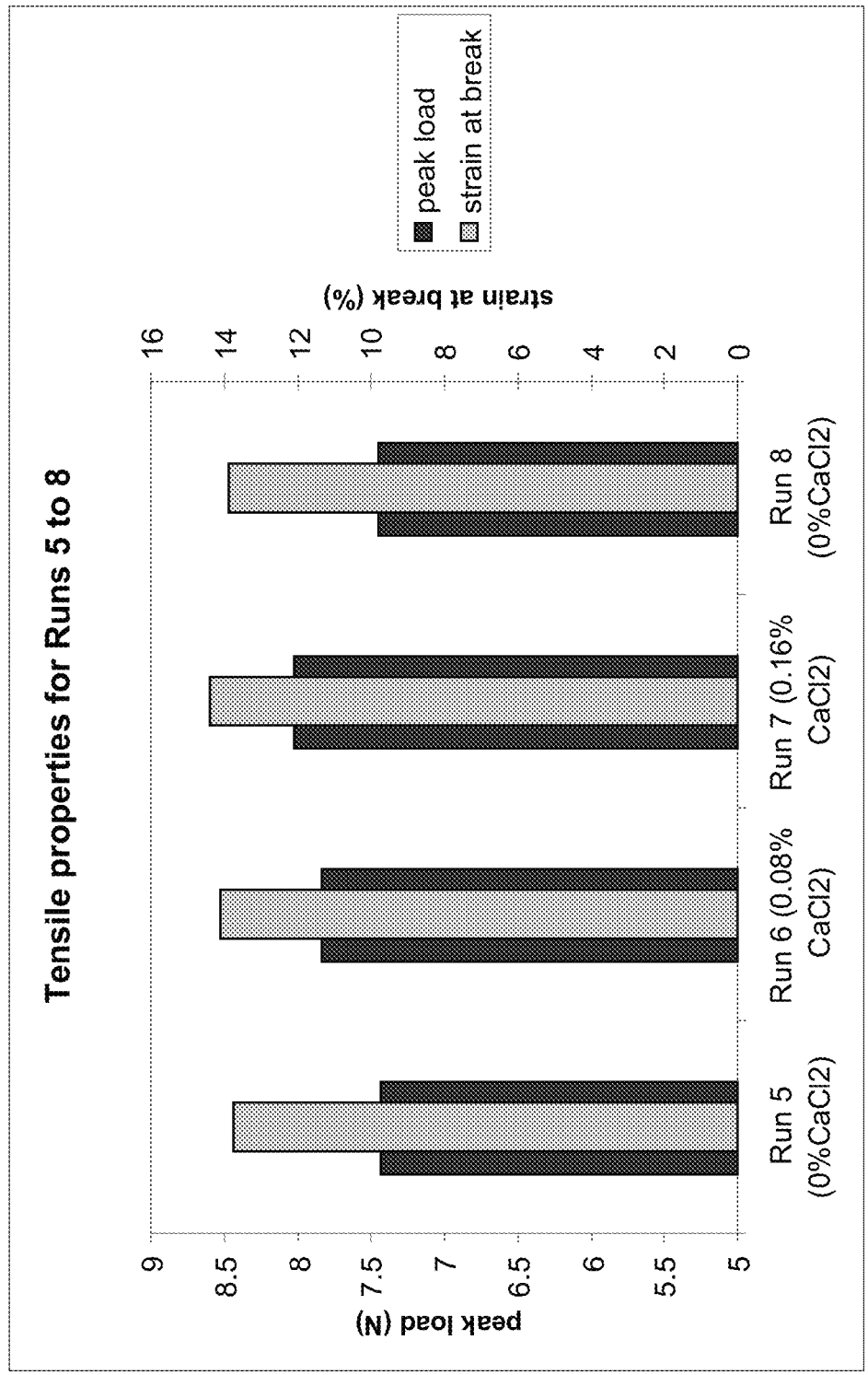
FIG. 2 charts tensile properties for four additional experimental runs, wherein calcium chloride was added to a ceramic precursor batch composition in varying amounts in some experimental runs.

Honeycomb-shaped ware was extruded from the compositions set forth in Table 2 and evaluated for skin defects such as air checks and fissures, with skin quality results set forth in Table 2, showing that the addition of calcium chloride improved the skin quality. FIG. 2 shows the tensile properties of the extruded materials of the experimental runs. As can be seen, the values of tensile peak load for Runs 6 and 7 (with calcium chloride) were higher than those for Runs 5 and 8 (without calcium chloride). Without wishing to be limited by theory, it is believed that the improvements in tensile peak load with the addition of calcium chloride were a result of increased cohesive strength in the oil phase, consistent with the observation of reduced defects in the extruded materials.

Example 3

Four additional experimental runs were conducted from cordierite precursor batch compositions having the ingredients set forth in Table 3.

TABLE 3

| Ingredient | Run 9 (control) | Run 10 | Run 11 | Run 12 (Control) |
|---|---|---|---|---|
| Base dry ingredients (wt %) | | | | |
| Talc | 35-40 | 35-40 | 35-40 | 35-40 |
| Clay (calcined) | 15-20 | 15-20 | 15-20 | 15-20 |
| Clay (hydrous) | 15-20 | 15-20 | 15-20 | 15-20 |
| Alumina (boehmite) | 10-15 | 10-15 | 10-15 | 10-15 |
| Alumina (calcined) | 5-10 | 5-10 | 5-10 | 5-10 |
| Silica | 5-10 | 5-10 | 5-10 | 5-10 |
| Superadded ingredients (wt %) | | | | |
| Hydroxypropyl methylcellulose | 2-8 | 2-8 | 2-8 | 2-8 |
| Tall oil | 0.82 | 0.00 | 0.00 | 0.82 |
| Oleic acid | 0.00 | 0.82 | 0.00 | 0.00 |
| Linoleic acid | 0.00 | 0.00 | 0.82 | 0.00 |
| Polyalpha olefin | 5-10 | 5-10 | 5-10 | 5-10 |
| Water | 30-40 | 30-40 | 30-40 | 30-40 |

The compositions were identical to each other except oleic and linoleic acid were substituted for tall oil in certain experimental runs. Specifically, in Run 10, oleic acid was substituted for tall oil and in Run 11, linoleic acid was substituted for tall oil. Oleic acid is known to have a Ksp of about $10^{-10}$ at 67° C. and linoleic acid is known to have a Ksp of about $10^{-12}$ at 67° C. Tall oil is expected to have a Ksp between these two values as it is known as being a mixture of oleic and linoleic acid. Therefore, substitution of oleic acid for tall oil results in an increased amount of calcium soap in the oil phase of the composition, whereas substitution of linoleic acid for tall oil results in a decreased amount of calcium soap in the oil phase of the composition.

Figure 3:
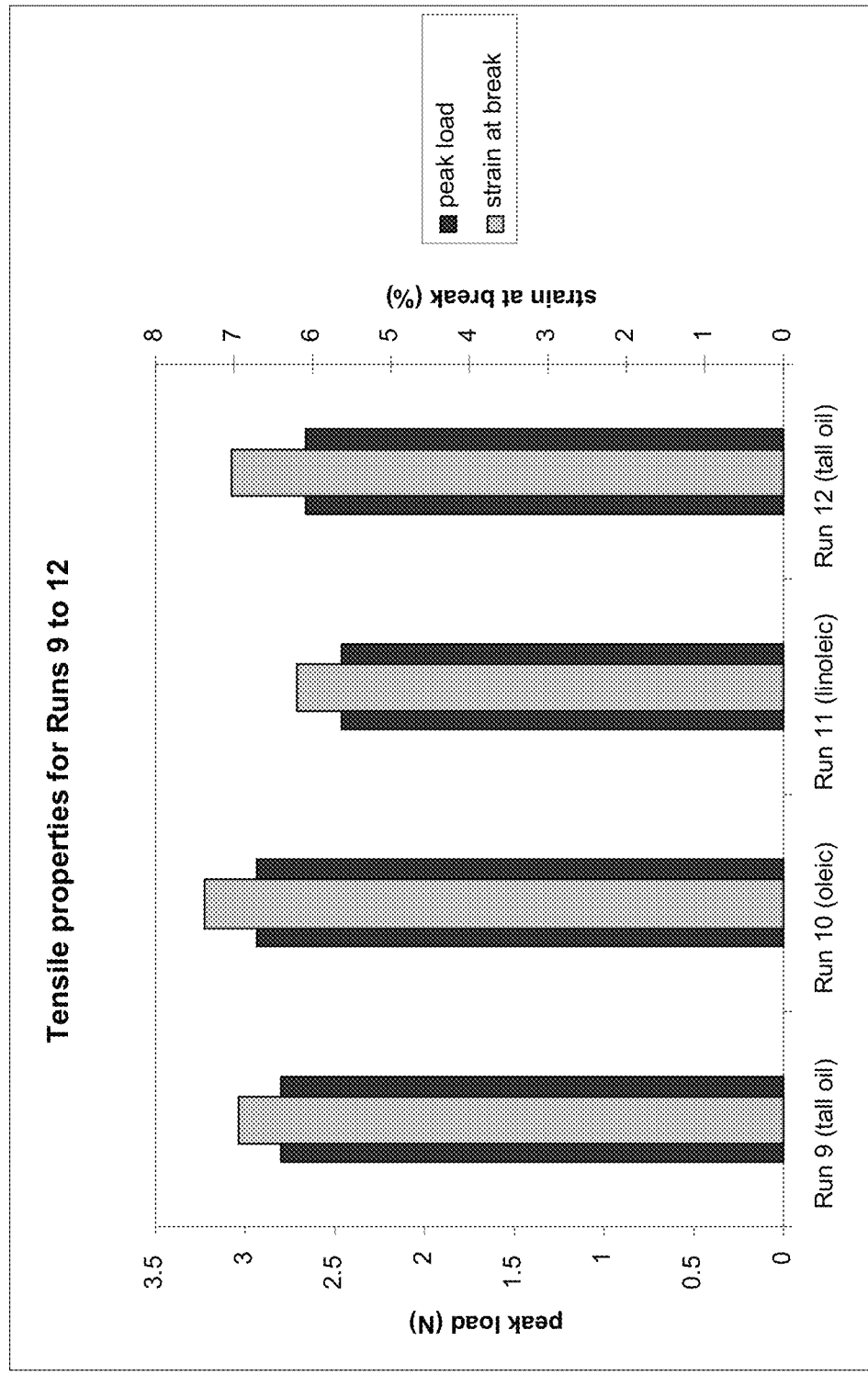
FIG. 3 charts tensile properties for four additional experimental runs, wherein oleic acid or linoleic acid was substituted for tall oil in some experimental runs.

Honeycomb-shaped ware was extruded from the compositions set forth in Table 3. FIG. 3 shows the tensile properties of the extruded materials of the experimental runs. As can be seen, the values of tensile peak load and strain at break was greatest for Run 10 (with oleic acid), less for Runs 9 and 12 (with tall oil) and lowest for Run 11 (with linoleic acid). Without wishing to be limited by theory, it is believed that the improvements in tensile peak load and strain at break with oleic acid were a result of increased cohesive strength in the oil phase, consistent with the observation of reduced defects in the extruded materials.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of reducing the presence of defects in ceramic articles and precursors, the method comprising:
   determining the incidence of a defect in a plurality of ceramic articles or precursors;
   increasing a concentration of a water insoluble soap in a precursor batch composition in response to the determining the incidence of the defect in the plurality of ceramic articles or precursors;
   determining the incidence of a defect in a plurality of ceramic articles or precursors made from the precursor batch composition after increasing the concentration of the water insoluble soap in the precursor batch composition.

2. The method of claim 1, wherein the water insoluble soap is an alkaline earth soap.

3. The method of claim 2, wherein the alkaline earth soap is selected from the group consisting of a calcium soap and a magnesium soap.

4. The method of claim 2, wherein the alkaline earth soap is a calcium soap.

5. The method of claim 2, wherein the alkaline earth soap is selected from the group consisting of calcium oleate, calcium laurate, magnesium oleate, magnesium laurate, calcium stearate, calcium palmitate, magnesium stearate, and magnesium palmitate.

6. The method of claim 1, wherein the concentration of water insoluble soap in the precursor batch composition is increased by at least one of: adding an amount of a common metal ion salt of a water insoluble soap to the precursor batch composition; adding an amount of water insoluble soap to the precursor batch composition; and lowering the overall solubility product of fatty acid and water insoluble soap metal ion in the precursor batch composition.

7. The method of claim 1, wherein the concentration of water insoluble soap in the precursor batch composition is increased by adding an amount of alkaline earth salt to the precursor batch composition.

8. The method of claim 7, wherein the amount of alkaline earth salt added to the precursor batch composition is at least 0.05% of the weight of the dry ingredients of the precursor batch composition.

9. The method of claim 7, wherein the alkaline earth salt is selected from the group consisting of calcium carbonate, calcium oxide, calcium chloride, magnesium carbonate, magnesium oxide, and magnesium chloride.

10. The method of claim 1, wherein the concentration of water insoluble soap in the precursor batch composition is increased by adding an amount of alkaline earth soap to the precursor batch composition.

11. The method of claim 10, wherein the amount of alkaline earth soap added to the precursor batch composition is at least 0.05% of the weight of the dry ingredients of the precursor batch composition.

12. The method of claim 1, wherein the concentration of water insoluble soap in the precursor batch composition is increased by lowering the overall solubility product of fatty acid and alkalline earth metal ion in the precursor batch composition.

13. The method of claim 12, wherein the overall solubility product of fatty acid and alkaline earth metal ion in the precursor batch composition is lowered to be below $10^{-11}$ at 67° C.

14. The method of claim 12, wherein the overall solubility product of fatty acid and alkaline earth metal ion is lowered by at least 50%.

15. The method of claim 12, wherein the overall solubility product of fatty acid and alkaline earth metal ion is lowered by at least 90%.

16. The method of claim 12, wherein the alkaline earth metal ion is calcium and the overall solubility product of fatty acid and calcium ion is lowered by adding a fatty acid having a solubility product with calcium ion of equal to or less than $10^{-12}$ at 67° C.

17. The method of claim 12, wherein the overall solubility product of fatty acid and alkalie earth metal ion is lowered by adding at least one of oleic acid, stearic aicd, palmitic acid, and lauric acid to the precursor batch composition.

18. The method of claim 1, wherein the defect is a green fissure.

19. The method of claim 1, wherein the incidence of a defect causing an article to be rejected for failing to meet specifications is reduced by at least 20%.

* * * * *